(12) United States Patent
Lee et al.

(10) Patent No.: US 8,619,707 B2
(45) Date of Patent: Dec. 31, 2013

(54) METHOD OF MANAGING ALLOCATED ADDRESS IN LOW POWER WIRELESS PERSONAL AREA NETWORK

(75) Inventors: Seoung-Bok Lee, Yogin-si (KR); Hyo Hyun Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 519 days.

(21) Appl. No.: 12/626,395

(22) Filed: Nov. 25, 2009

(65) Prior Publication Data

US 2010/0128624 A1 May 27, 2010

(30) Foreign Application Priority Data

Nov. 25, 2008 (KR) .................. 10-2008-0117401

(51) Int. Cl.
*H04W 4/00* (2009.01)
(52) U.S. Cl.
USPC ............ 370/331; 455/436; 455/437; 455/438
(58) Field of Classification Search
USPC ........ 370/328, 310.2, 331; 455/436, 437, 438
See application file for complete search history.

(56) References Cited

U.S. PATENT DOCUMENTS

| | | | | |
|---|---|---|---|---|
| 7,558,567 | B2* | 7/2009 | Garg | 455/424 |
| 8,036,665 | B2* | 10/2011 | Shah | 455/438 |
| 2001/0006515 | A1* | 7/2001 | Lee et al. | 370/331 |
| 2003/0016648 | A1* | 1/2003 | Lindsay et al. | 370/347 |
| 2008/0194262 | A1* | 8/2008 | Choi et al. | 455/437 |
| 2008/0218414 | A1* | 9/2008 | Hagerman et al. | 342/368 |
| 2009/0147767 | A1* | 6/2009 | Lee | 370/349 |
| 2009/0180444 | A1* | 7/2009 | McManus et al. | 370/332 |

\* cited by examiner

*Primary Examiner* — Omer Mian
(74) *Attorney, Agent, or Firm* — The Farrell Law Firm, P.C.

(57) ABSTRACT

Disclosed is a method of managing an allocated address through a coordinator in a Low Power Wireless Personal Area Network (LoWPAN) including receiving a first beacon data request message from a mobile node that has entered into a communication region of the coordinator; measuring a Link Quality Indication (LQI) of the first beacon data request message, setting the measured LQI as a minimum communication threshold value with the mobile node, and setting an alarm region that is an LQI range for sensing whether the mobile node leaves the communication region; if a second beacon data request message is received from the mobile node, measuring an LQI of the second beacon data request message, and checking whether the measured LQI of the second beacon data request message is included in the alarm region; and if the LQI is included in the alarm region, periodically transmitting a node alive check message to the mobile node.

4 Claims, 6 Drawing Sheets

METHOD OF MANAGING ALLOCATED ADDRESS IN LOW POWER WIRELESS PERSONAL AREA NETWORK

PRIORITY

This application claims priority under 35 U.S.C. §119(a) to an application entitled "Method Of Managing Allocated Address In Low Power Wireless Personal Area Network" filed in the Korean Industrial Property Office on Nov. 25, 2008 and assigned Serial No. 10-2008-0117401, the contents of which are hereby incorporated by reference.

BACKGROUND OF THE INVENTION

1. Field of the Invention

The present invention relates to a method of managing an allocated address in a low power wireless personal area network.

2. Description of the Related Art

In general, a Personal Area Network (PAN) differs from a Local Area Network (LAN) or a Wide Area Network (WAN), and in the PAN, each person has an inherent network. A PAN can be used in diverse fields such as a wireless sensor network, a home network, and the like. In order to wirelessly implement the PAN, diverse standards have been proposed, and one of such standards is the Low power Wireless Personal Area Network (LoWPAN), which is a wireless sensor network implemented using the Institute of Electrical and Electronics Engineers (IEEE) 802.15.4 standard.

Also, LoWPAN, to which an Internet Protocol-Ubiquitous Sensor Network (IP-USN) based Internet Protocol (IP) version 6 is applied, is referred to as 6LoWPAN. 6LoWPAN includes a PAN coordinator which provides an outside interface and serves as a whole manager managing the routing and synchronization of nodes included in the 6LoWPAN, a coordinator or a Full Function Device (FFD) that supports the routing function, and a Reduced-Function Device (RFD) that does not support the routing function. The PAN coordinator manages addresses to be allocated to all nodes included in the 6LoWPAN. Since the address has a hierarchical network structure and an address system, such as ZigBee, and is mainly composed of 16 bits for its energy efficiency, the addresses are limited in number.

The coordinator (or FFD) allocates an inherent address to an RFD or its child node which has entered into its communication region, and the address allocated to the child node is one of the addresses managed by the PAN coordinator. In this case, the FFD or RFD is allocated with an address for communicating with a parent node through the parent node that has a one-hop connection with the FFD or RFD. The parent node may be a coordinator (or FFD) that supports the routing function.

LoWPAN provides diverse services and application programs as it evolves into a network that supports not only a simple data sensing process in the existing sensor network but also an IP environment in the IP-USN. An example of the IP-USN application and implementation may be a coupon service, which will now be described in detail.

First, in a crowded shopping area, each store is provided with nodes for coupon services. In the case where a customer has a portable terminal, each store can receive coupon services from an external server (e.g. a chain store), and the customer can inquire about the details of an interested coupon service. The hierarchical structure for such coupon services is similar to the hierarchical LoWPAN environment of the IP-USN. That is, the chain store corresponds to the PAN coordinator, the node of each store corresponds to the coordinator (or FFD), and the customer's portable terminal corresponds to the RFD. In this environment, the customer's portable terminal, i.e. the RFD, is required to receive the coupon services during the movement of the portable terminal.

However, the address management policy (or algorithm) in the current LoWPAN takes into consideration only fixed nodes, and due to the limited resources and the energy efficiency of LoWPAN, it is difficult to apply the address management policy (or algorithm) to the mobile IP environment having a large amount of data and a wide communication bandwidth. Accordingly, there is a need for a scheme for efficiently managing addresses that takes into consideration mobile nodes in LoWPAN.

SUMMARY OF THE INVENTION

Accordingly, the present invention has been made to solve the above-mentioned problem, and an object of the present invention is to provide a method of managing an allocated address in a Low power Wireless Personal Area Network (LoWPAN).

In accordance with an aspect of the present invention, there is provided a method of managing an allocated address through a coordinator in a Low Power Wireless Personal Area Network (LoWPAN), which includes receiving a first beacon data request message from a mobile node that has entered into a communication region of the coordinator; measuring a Link Quality Indication (LQI) of the first beacon data request message, setting the measured LQI as a minimum communication threshold value with the mobile node, and setting an alarm region that is an LQI range for sensing whether the mobile node leaves the communication region; if a second beacon data request message is received from the mobile node, measuring an LQI of the second beacon data request message, and checking whether the measured LQI of the second beacon data request message is within the alarm region; and if the LQI is within in the alarm region, periodically transmitting a node alive check Message to the mobile node.

In accordance with another aspect of the present invention, there is provided a method of managing an allocated address through a mobile node in a Low Power Wireless Personal Area Network (LoWPAN), including entering into a communication region of a first coordinator, and then transmitting a first beacon data request message to the first coordinator; if a first beacon data response message including a Link Quality Indication (LQI) of the first beacon data request message is received from the first coordinator, setting the LQI of the first beacon data request message as a minimum communication threshold value that is an LQI communication with the first coordinator, and setting an alarm region that is an LQI range for sensing whether the mobile node leaves the communication region; transmitting a second beacon request message to the first coordinator, receiving a second beacon response message including the LQI of the second beacon request message, and checking whether the LQI of the second beacon request message is below the minimum communication threshold value; and if the LQI of the second beacon request message is below the minimum communication threshold value, recognizing that the mobile node itself is located within the alarm region, and periodically transmitting an active scan request message to the first coordinator.

In accordance with another aspect of the present invention, there is provided a system for managing an allocated address in a Low power Wireless Personal Area Network (LoWPAN), including a mobile node that leaves a communication region of a first coordinator having performed an association procedure transmitting a disassociation request message to the first coordinator; the mobile node transmitting a beacon request message to neighbor nodes of the mobile node in a state where the mobile node cannot receive a response to the disassociation request message; and if response messages to the beacon request message are received from the neighboring nodes, the mobile node selecting the neighbor node of the mobile node, having transmitted the response message having the highest signal strength among the response messages, as an object of a new association procedure.

In accordance with another aspect of the present invention, there is provided a system for managing an allocated address in a Low power Wireless Personal Area Network (LoWPAN), including if communication state with a mobile node, which has entered into a communication region of a first a mobile node and has performed an association procedure, continues for a predetermined time, the first coordinator requesting neighbor nodes of the first coordinator to register the mobile node as an orphan node; if a second coordinator, which is one of the neighbor nodes of the first coordinator, receives the registration request, mapping and storing the mobile node and time when the registration request was received in an orphan node table of the second coordinator; the mobile node, having performed the association procedure, broadcasting a disassociation request message with the first coordinator to the neighbor nodes of the mobile node in a state where the mobile node has left the communication region of the first coordinator; if the second coordinator has received the disassociation request message, checking whether to store the mobile node in the orphan node table of the second coordinator; and if the mobile node is stored in the orphan node table, the second coordinator transmitting the disassociation request message with the first coordinator to the first coordinator.

In accordance with another aspect of the present invention, there is provided a method of managing an allocated address in a Low power Wireless Personal Area Network (LoWPAN), including a mobile node, having left a communication region of a first coordinator having performed an association procedure, broadcasting a disassociation request message to neighbor nodes of the mobile node, and operating a first timer for waiting for reception of a response message to the disassociation request with the first coordinator; and if the operating time of the first timer expires, the mobile node performing the disassociation procedure with the first coordinator regardless of whether the response message is received.

In a LoWPAN, a coordinator, which is in Medium Access Control (MAC)-association state with corresponding child nodes, periodically confirm whether the corresponding child nodes leaves the communication region, and enhances the possibility of success of a MAC-disassociation procedure of mobile nodes, of which the MAC-disassociation procedure has not been completed, through neighbor nodes. Accordingly, the coordinator can efficiently allocate the limited addresses of the PAN coordinator to the respective mobile nodes.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Figure 1:
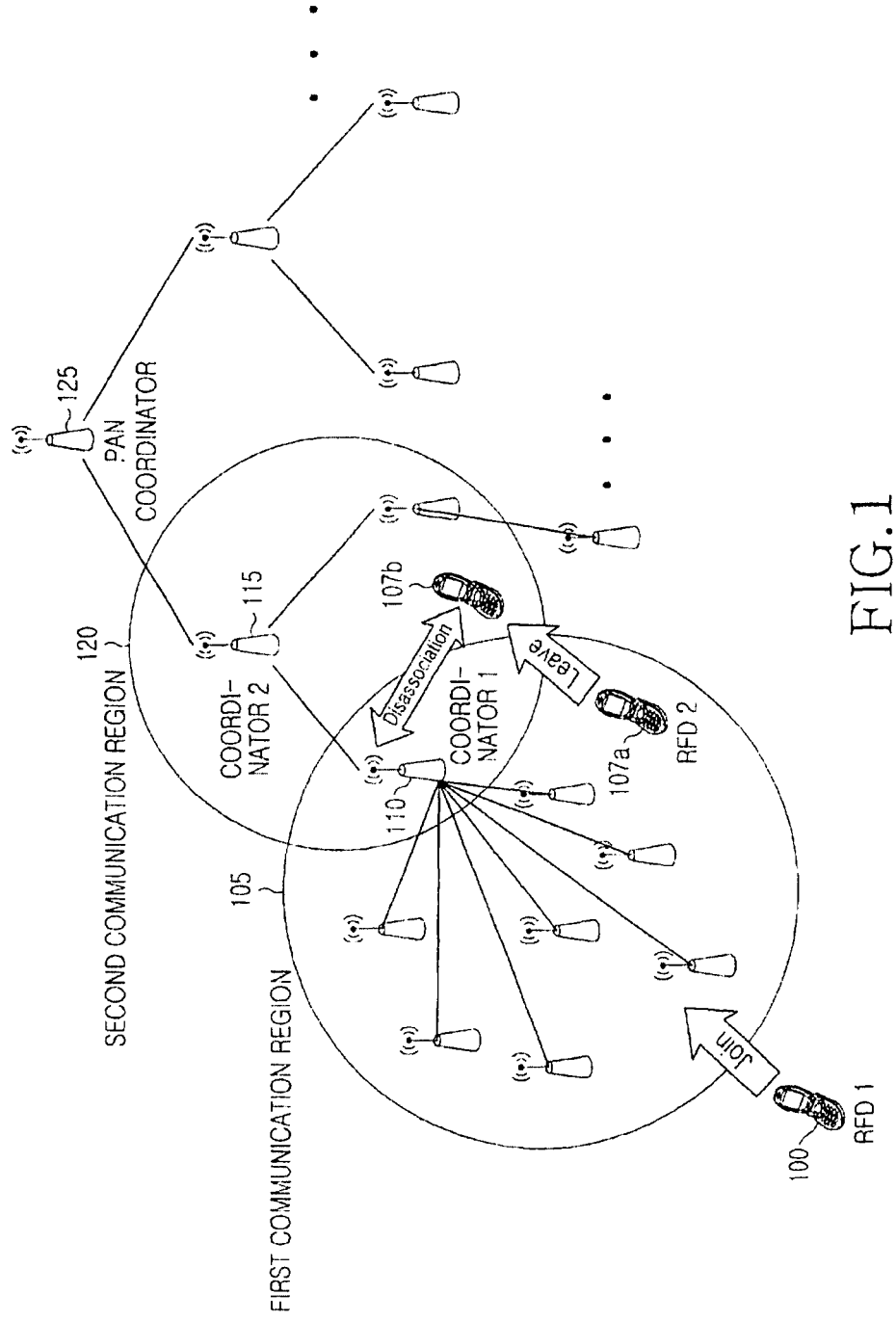
FIG. 1 is a diagram explaining an address managing method in a general LoWPAN.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention proposes a method of managing an allocated address in a Low Power Wireless Personal Area Network (LoWPAN).

The following terms are used herein. One hop from a corresponding coordinator in the LoWPAN is referred to as a communication region. Nodes communicating within a one-hop range are defined as child nodes of the coordinator, and the coordinator is defined as a parent node of child nodes. The parent node is a node that manages routing in its communication region, and is provided with an address pool. If connection requests are received from nodes located in the communication region of the parent node, the parent node allocates addresses, which are not currently used and are provided in the address pool, to the nodes from which the connection requests have been received. The address pool includes inherent addresses acquired from a Personal Area Network (PAN) coordinator.

FIG. 1 is a diagram explaining an address managing method in a general LoWPAN.

Referring to FIG. 1, if a Reduced-Function Device (RFD) 1 100 enters into a first communication region 105, the RFD 1 100 broadcasts a join message. A coordinator 1 110, having received the join message, performs a MAC-association procedure, which is a network connection procedure, with the RFD 1 100, and thus the coordinator 1 110 and the RFD 1 100 form parent node—child node relations with each other to engage in communications with each other. In this case, the coordinator 1 110 allocates an address, which is not in use and is provided in the address pool, to the RFD 1 100.

If a child node connected with the coordinator 1 110, i.e. RFD 2 107a, moves from the first communication region 105 to a second communication region 120, the RFD 2 107a performs a MAC-disassociation procedure, which is a network-leaving procedure, with the coordinator 1 110 to release the connection with the coordinator 1 110. At this time, the address that the coordinator 1 110 has allocated to the RFD 2 107a is returned to the coordinator 1 110. Then, the coordinator 1 110 manages the address returned from the RFD 2

107a as an address that is not in use in its address pool, and transmits a MAC-disassociation confirming signal to the RFD 2 107a.

Thereafter, another RFD 2 107b, having entered into the second communication region 120, is allocated with a new address from the coordinator 2 115 by performing a MAC-association procedure with another coordinator 2 115 that is located in the second communication region 120.

As described above, most fixed nodes included in a LoW-PAN automatically perform the MAC-association and MAC-disassociation procedures when they enter into a certain communication region or leave the certain communication region. Accordingly, the signal of the corresponding node, which is located in a place where the communication environment is unstable or in an uppermost communication limit region, has an unstable boundary value to cause the MAC-association and MAC-disassociation procedures to be repeated. As a result, the energy efficiency of the corresponding node may be further lowered, and due to the repetition of the MAC-association and MAC-disassociation procedures, resources of the address pool of the corresponding communication region may be wasted.

Also, as the RFD 2 107a moves and leaves the first communication region 105, the RFD 2 107a may be allocated with another address through a MAC-association procedure with a new coordinator 2 115 in a state where it cannot receive the MAC-disassociation confirming message from the coordinator 1 110. Consequently, the RFD 2 107a may be allocated with two addresses from two parent nodes in the LoW-PAN network which causes a waste of the address resources.

If the RFD 2 107a senses the moment where the signal strength of a beacon signal or Link Quality Indication (LQI) information received from the coordinator 1 110 passes below a specified signal strength, it request the MAC-disassociation from the coordinator 1 110. The signal strength of the beacon signal or LQI is acquired through a periodic communication between the corresponding child node and the parent node, that is, transmitting/receiving a beacon data request/response message and transmitting/receiving a poll request/response message.

First, the transmitting/receiving a beacon data request/response message includes an active scan and a passive scan. According to the active scan, a parent node scans neighbor nodes before it performs the association procedure. Then, the parent node receives beacon data request messages for requesting a beacon signal or LQI from the scanned neighbor nodes, selects one of the received beacon data request messages, and transmits a beacon data response message that includes a measured value of the LQI of the beacon data request message and its own beacon signal. Then, a certain child node acquires the LQI from the received beacon data response message, or measures the signal strength of the received beacon signal to acquire the signal strength of the received beacon signal.

According to the passive scan, a parent node periodically transmits its own beacon signal. This has the drawback that the energy efficiency is lowered in comparison to the active scan.

Second, according to transmitting/receiving a poll, a child node mainly transmits a poll request message for requesting data to its parent node that has performed the association procedure, and the parent node, having received the poll request message, transmits a poll response message to the child node. The poll response message includes bit information for indicating the existence/nonexistence of data pending in the parent node.

In the case where a certain child node detects the signal strength of the beacon signal or LQI for its parent node through the above-described periodic communication, the certain child node can quickly detect the time of leaving the corresponding communication region as the transmission/reception period of the beacon data request/response message or the poll request/response message arrives quickly.

By contrast, the periodic communication method has the drawback that the energy efficiency becomes deteriorated due to the frequent message transmitting/receiving procedures. The certain child node detects the leaving time late from the specified communication region as the transmission/reception period of the beacon data request/response message or the poll request/response message arrives late. However, since the frequency of message transmission/reception is relatively reduced, the energy efficiency becomes relatively improved. That is, as the corresponding node detects the leaving time late from the specified communication region, the corresponding node cannot allocate the address, which has been allocated from the specified communication region, but which is not in use, to another node which causes the waste of resources of the allocable addresses.

Accordingly, the present invention provides three methods for more efficiently managing the address poll that is allocable in a LoWPAN.

In the first embodiment of the present invention, the leaving of an RFD from the communication region is sensed using an alive checking method. In the second embodiment of the present invention, if an RFD, which proceeds with the MAC-disassociation procedure, moves to a communication region managed by another coordinator, the proceeding MAC-disassociation procedure is completed through neighbor nodes. In the third embodiment of the present invention, if an RFD, which proceeds with the MAC-disassociation procedure, is in an a non-communication state with its parent node, the RFD periodically broadcasts a MAC-disassociation request with its parent node to neighbor nodes, and the neighbor nodes, having received this request, broadcast MAC-disassociation requests with the parent node to their neighbor nodes. In this case, the RFD and the parent node manage their own timers by way of precaution against the case where the transmission/reception of the messages for the MAC-disassociation procedure becomes impossible. If the operation time of the timers expire, they perform the MAC-disassociation for themselves.

In the first embodiment of the present invention, the subject that performs the alive checking is classified into two cases. That is, the subject may be a parent node that manages certain child nodes, i.e. a coordinator of the communication region, or may be certain child nodes, i.e. RFD mobile nodes.

Figure 2:
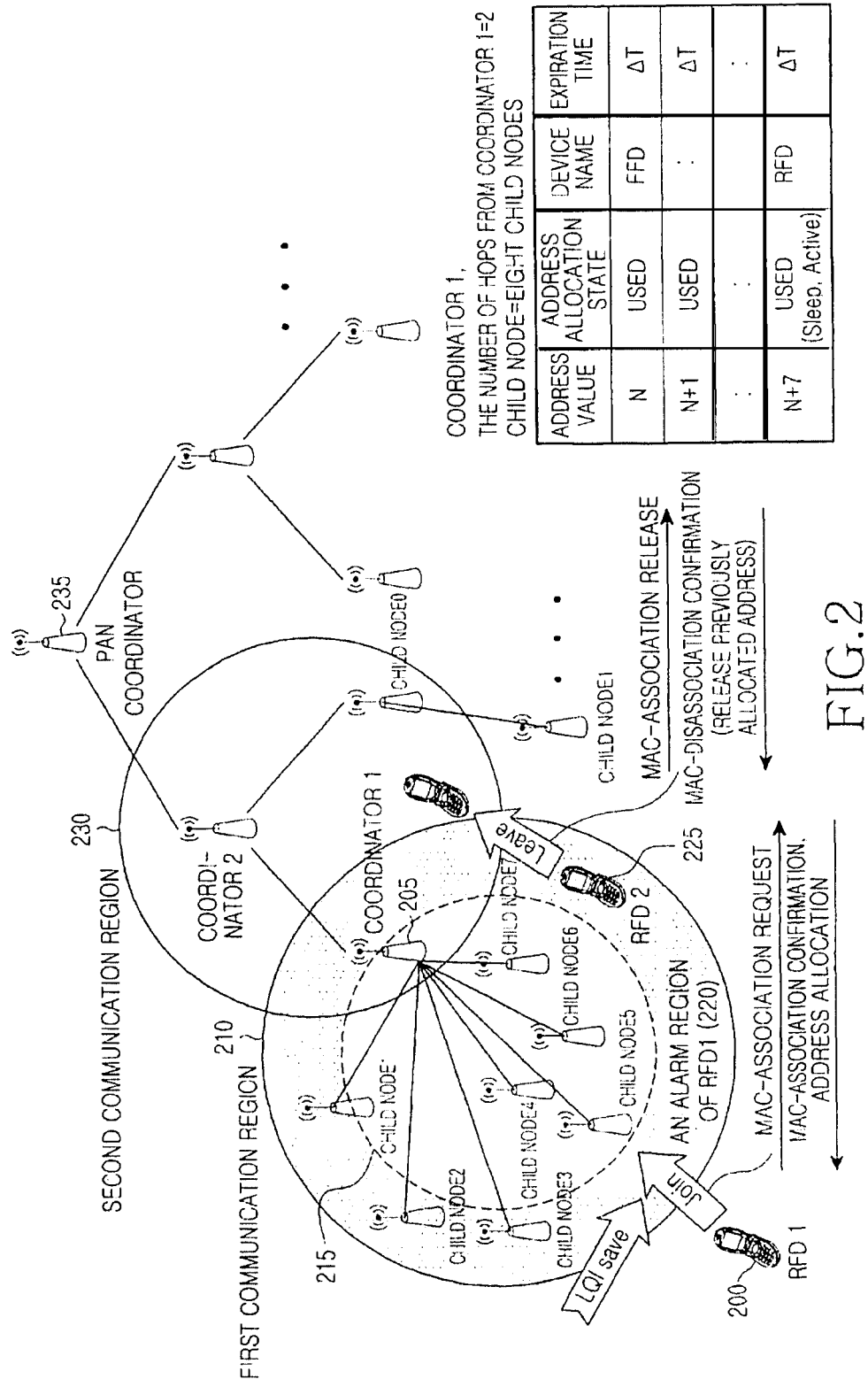
FIG. 2 is a diagram explaining the alive checking of the parent node according to a first embodiment of the present invention.

FIG. 2 is a diagram explaining the alive checking of the parent node according to the first embodiment of the present invention.

Referring to FIG. 2, when an RFD 1 200 enters into the first communication region 210 of a coordinator 1 205, it transmits a beacon data request message to the coordinator 1 205. Here, it is assumed that the number of hops in the communication region is 2.

The coordinator 1 205, having received the beacon data request message, registers the RFD 1 200 as its neighbor node in its own neighbor node table. the RFD 1 200 maps the LQI value when it enters into the first communication region 210 on the address value to store the LQI value. Here, for convenience in explanation, it is assumed that only the LQI value between the signal strength of the beacon signal and the LQI, which are received through transmission of the beacon data request message, is used. The neighbor node table stores therein neighbor nodes included in the communication regions of all nodes existing in the wireless sensor network, node addresses mapping on the stored neighbor nodes, respectively, address value allocated by the coordinator 1 205, data indicating whether the corresponding device is the RFD or Full Function Device (FFD), and set times of an internal timer. The address allocation status includes indicators indicating whether the corresponding node is in an active mode for the energy efficiency or in a sleep mode.

In this case, the coordinator 1 205 sets the LQI value stored during the initial entrance of the RFD 1 200 as the minimum communication threshold value. Then, the coordinator 1 250 sets the remaining region 220, which is obtained by subtracting a region 215 that corresponds to the LQI value corresponding to the minimum communication threshold value from the first communication region 210, as an alarm region for sensing the seceding of the RFD 1 200.

Then, if the MAC-association procedure between the RFD 1 200 and the coordinator 1 205 is performed, the RFD 1 200 and the coordinator 1 205 form child-parent node relations with each other, and thus the packet transmission/reception between them becomes possible.

Then, the coordinator 1 205 checks whether the LQI value included in the data received from the RFD 2 225 located in the alarm region is included in the LQI range of the alarm region 220. If the LQI value is included in the LQI range included in the alarm region 220, the coordinator 1 205 transmits a node alive checking message for checking whether the child node 8 225 leaves the first communication region 210 to the RFD 2 225. If the RFD 2 225 has received the node alive checking message, the RFD 2 225 transmits an ACKnowledgement (ACK) message to the coordinator 1 205. In this case, the coordinator 1 205 again acquires the LQI included in the received ACK message.

That is, the coordinator 1 205 periodically transmits an alive node checking message to the RFD 2 225 located in the alarm region 220 after the coordinator 1 205 confirms that the RFD 2 225 is located within the alarm region 220. Also, the coordinator 1 205 continuously observes the LQI information included in the received ACK message with the lapse of time by responding to the alive node checking message. If the LQI value that is below a specified value is continuously observed from the ACK messages received for a predetermined time, or if the LQI value observed for the predetermined time is continuously less than the previously received LQI value, the coordinator 1 205 requests the MAC-disassociation procedure from the RFD 2 225 located in the alarm region 220.

The RFD 2 225, having terminated the MAC-disassociation procedure with the coordinator 1 205, is registered as a child node of the new different coordinator through a new MAC-association procedure with a new different coordinator to resume the communication state.

On the other hand, if no data transmission occurs between the coordinator 1 205 and the RFD 2 225 located in the alarm region 220 for a predetermined time after the coordinator 1 205 transmits the node alive checking message to the RFD 2 225 located in the alarm region 220, the coordinator 1 205 is shifted from an active mode to a sleep mode for energy efficiency. Once the coordinator 1 205 is shifted to the sleep mode, the coordinator 1 205 sets the transmission period of the node alive checking message so that the transmission period is slower than the previous one. Relatively, in the active mode before shilling to the sleep mode, the coordinator 1 205 sets the period of the node alive checking message so that the set period is faster than that in the sleep mode.

Figure 3:
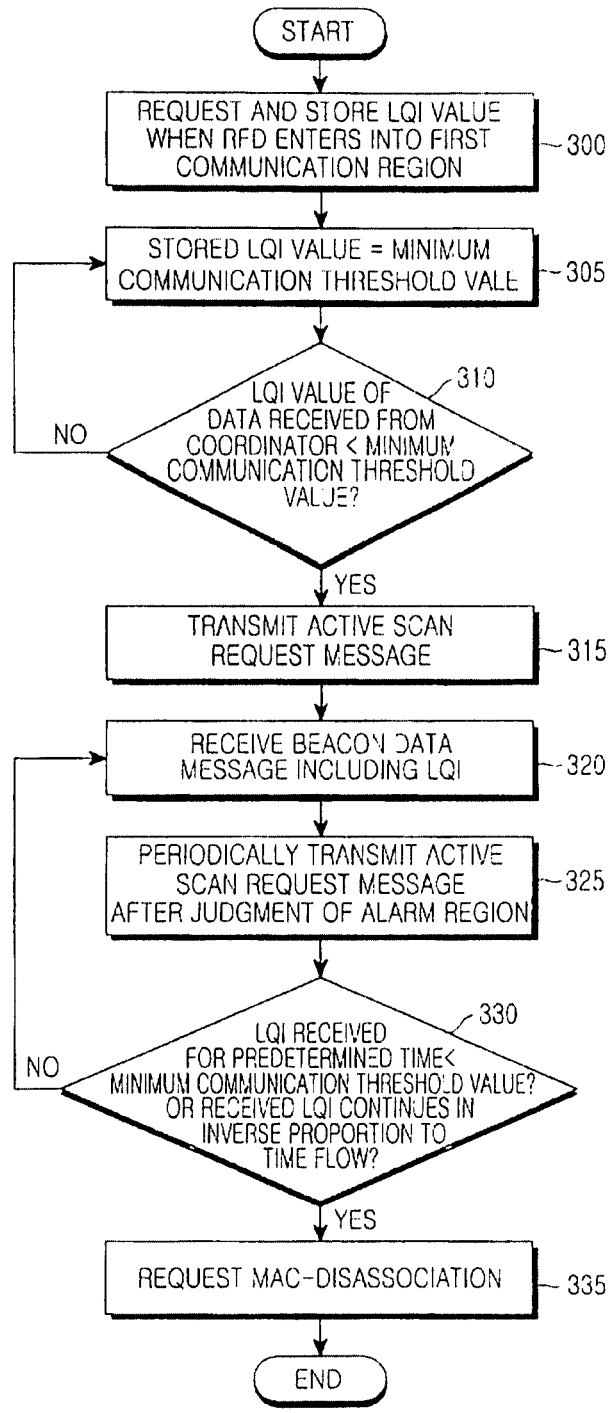
FIG. 3 is a diagram illustrating an alive checking method of the RFD mobile node according to a first embodiment of the present invention.

FIG. 3 is a diagram illustrating an alive checking method of the RFD mobile node according to the first embodiment of the present invention.

It is assumed that the RED 2 225 is located in the alarm region 220 in a state that the RFD 1 200 forms child node— parent node relations with the coordinator 1 205 by performing the MAC-association procedure with the coordinator 1 205, and transmits/receives data.

Referring to FIG. 3, if the RFD 2 225, which enters into the first communication region 210, transmits the beacon data request message for requesting the LQI value to the coordinator 1 205, and then acquires the LQI of the coordinator 1 205 in response to the beacon data request message sent to the coordinator 1 205, the RFD 2 225 stores the acquired LQI value in step 300, and proceeds to step 305.

In step 305, the RFD 2 220 set the stored LQI value as the minimum communication threshold value in the first communication region 210, and sets the remaining region, which is obtained by subtracting a region 215 that corresponds to the LQI value corresponding to the set minimum communication threshold value from the first communication region 210, as an alarm region 220 for sensing the seceding of the RFD 1 225.

In step 310, the RFD 2 225 transmits an active scan request message to the coordinator 1 205, and then checks whether the LQI value included in the response message is less than the minimum communication threshold value. If the LQI value is equal to or greater than the minimum communication threshold value as the result of checking, the RFD 2 225 returns to step 305, and waits for the data reception from the coordinator 1 205. If the LQI value is less than the minimum communication threshold value as the result of checking, the RFD 2 225 recognizes that it is located in the set alarm region 220, and transmits the active scan request message to the coordinator 1 205 in step 315.

In step 320, the RFD 2 225 receives a beacon data response message that includes the LQI information from the coordinator 1 205 as a response to the active scan request message, and proceeds to step 325.

In step 325, the RFD 2 225 periodically transmits the active scan request message to the coordinator 1 205, and proceeds to step 330. In step 330, the RFD 2 225 continuously observes the LQI information of the beacon data response message received from the coordinator 1 205 with the lapse of time. If the LQI value that is below a specified value is observed from the beacon data response messaged received for a predetermined time, or if the LQI value observed for the predetermined time is less than the LQI value previously received, the RFD 2 225 requests the MAC-disassociation procedure from the coordinator 1 205 in step 335.

After the completion of the MAC-disassociation procedure, the RFD 2 225 is registered as a child node of a new different coordinator through a new MAC-association procedure with a new different coordinator, and resumes the communication state.

According to the first embodiment of the present invention as described above, if the mobile node or the parent node of the mobile node transmits the alive checking method for periodically checking whether the mobile node leaves the communication region, the parent node of the mobile node can sense the leaving of the mobile node before the mobile node requests the MAC-association procedure to another coordinator that is not the parent node of the mobile node. Accordingly, the parent node of the mobile node quickly deletes the address allocated to the mobile node from its neighbor node table, and thus the mobile node is prevented from being allocated with two addresses. Also, even if the MAC-disassociation with the current parent node fails midway, the mobile node can recognize that the mobile node itself is located in the alarm mode. That is, if the alive checking message is not received from the parent node for a predetermined time, the mobile node can recognize that the mobile node itself has left the one-hop region of the parent node or is located in a non-communication region.

In the second embodiment of the present invention, two methods for the RFD to complete the previous MAC-disassociation procedure are provided. In the case where the RFD, which is in the MAC-disassociation procedure, moves to a communication region managed by another coordinator, the RFD completes the previous MAC-disassociation procedure.

Figure 4:
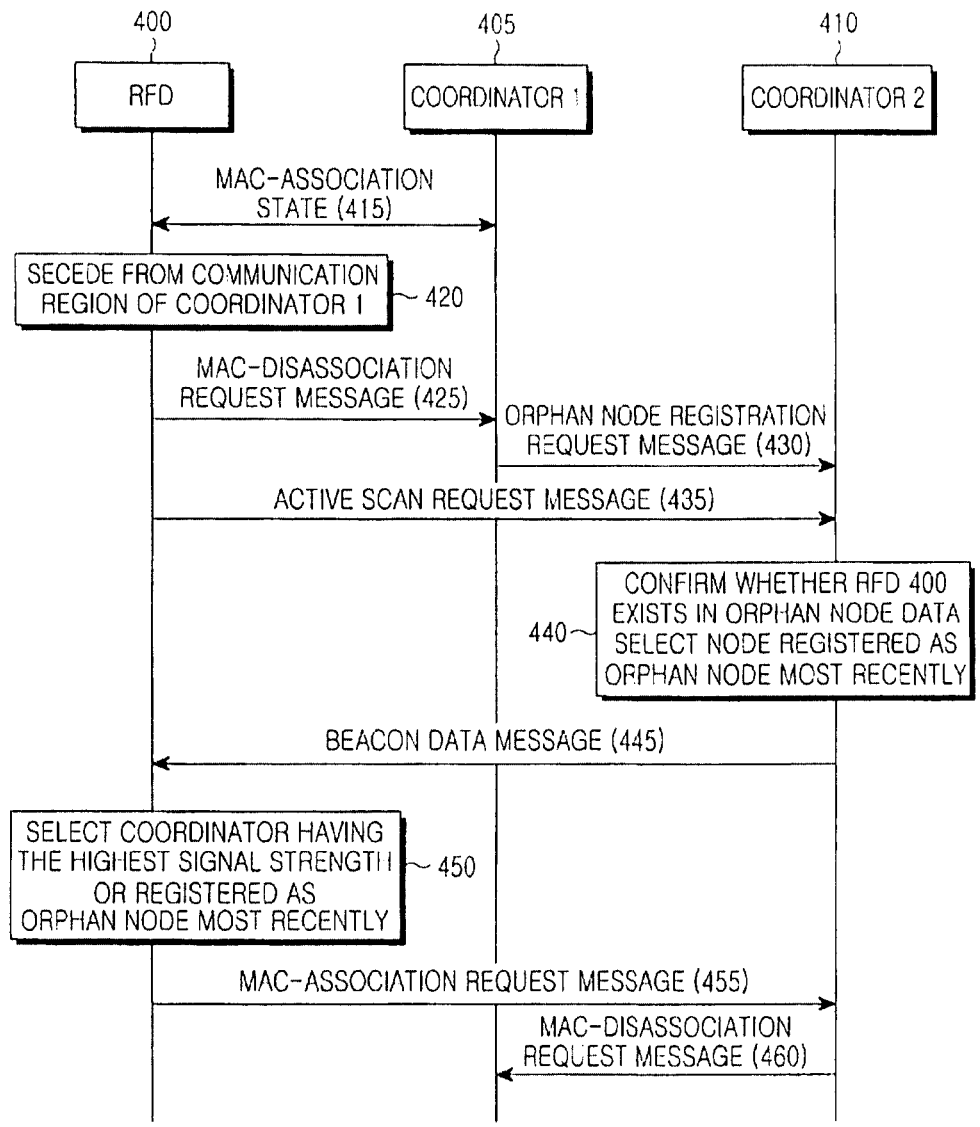
FIG. 4 is a diagram illustrating a first method of completing the MAC-disassociation procedure with the previous coordinator through neighbor nodes according to a second embodiment of the present invention.

FIG. 4 is a diagram illustrating a first method of completing the MAC-disassociation procedure with the previous coordinator through neighbor nodes according to the second embodiment of the present invention.

If the non-communication state between the respective coordinators and their child nodes continues for a predetermined time without the completion of the MAC-disassociation between the coordinators and their child nodes, the coordinators broadcast signals for requesting the registration of the child nodes in the non-communication state as orphan nodes. The neighbor nodes, having received the signals, stores the mobile nodes requested to register as orphan nodes in an orphan node managing table managed by the neighbor nodes themselves. In the orphan node managing table, names of the orphan nodes, coordinators having requested the registration of the orphan nodes, and times when the registration of the orphan nodes is requested are mapped and stored. Here, although it is exemplified that one coordinator 2 410 corresponds to the neighbor node of an RFD 400 and a coordinator 1 405, plural nodes may actually exist.

Referring to FIG. 4, the RFD 400, which is in the MAC-association state with the coordinator 1 405 in step 415, moves and leaves from the communication region of the coordinator 1 405 in step 420. In step 425, the RFD 400 transmits the MAC-disassociation request message to the coordinator 1 405. However, since the RFD 400 has left the communication region of the coordinator 1 405, the RFD 400 is in the state where it has not received the confirmation message that is the response to the MAC-disassociation request from the coordinator 1 405, i.e., in an a non-communication state. At this time, the coordinator 1 405 maintains the RFD 400 and the address allocated during the MAC-association procedure with the RFD 400 in its neighbor node table. Thereafter, if the non-communication state with the RFD 400 continues for the predetermined time, the coordinator 1 405 broadcasts the orphan node registration request message of the RFD 400 to its neighbor node, i.e. the coordinator 2 410.

In step 435, the RFD 400 broadcasts the active scan request message. In step 440, the coordinator 2 410, having received the active scan request message, confirms whether the RFD 400 exists in its orphan node managing table. If the RFD 400 exists in the orphan node managing table, the coordinator 2 410 transmits a beacon data response message, which includes a bit signal for reporting that the RFD exists in its orphan node managing table and the time when the orphan node was registered, being included in a payload, to the RFD 400. If a plurality of coordinators, which have registered the RFD 400 in the orphan node table of the coordinator 2 410 as the orphan node, exist, it is assumed that the RFD 400 is the coordinator that has most recently registered the RFD 400 as the orphan node, e.g. the coordinator 1 405. On the other hand, the coordinator 2 410 deletes orphan nodes, which have not transmitted the active scan request message for a predetermined time, from the orphan node table.

In step 450, the RFD 400, having received the beacon data response message, selects the coordinator 2 410 as a new coordinator to perform the MAC-association procedure, and transmits a MAC-association request message to the selected coordinator 2 410 in step 455. a plurality of beacon data response messages are received, the RFD 400 preferentially selects the coordinator that has transmitted the beacon data response message having the highest signal strength among the beacon data response messages, as an object of a new association procedure: On the other hand, if there is no great difference in signal strength between the received beacon data response messages, the RFD 400 selects the coordinator having the latest registration time among the coordinators having transmitted the beacon data response messages including the bit signals.

In step 460, the coordinator 2 410 transfers the MAC-disassociation request of the RFD 400 to the coordinator 1 405 in place of the RFD 400. Then, the coordinator 1 405 performs the MAC-disassociation procedure with the RFD 400.

Figure 5:
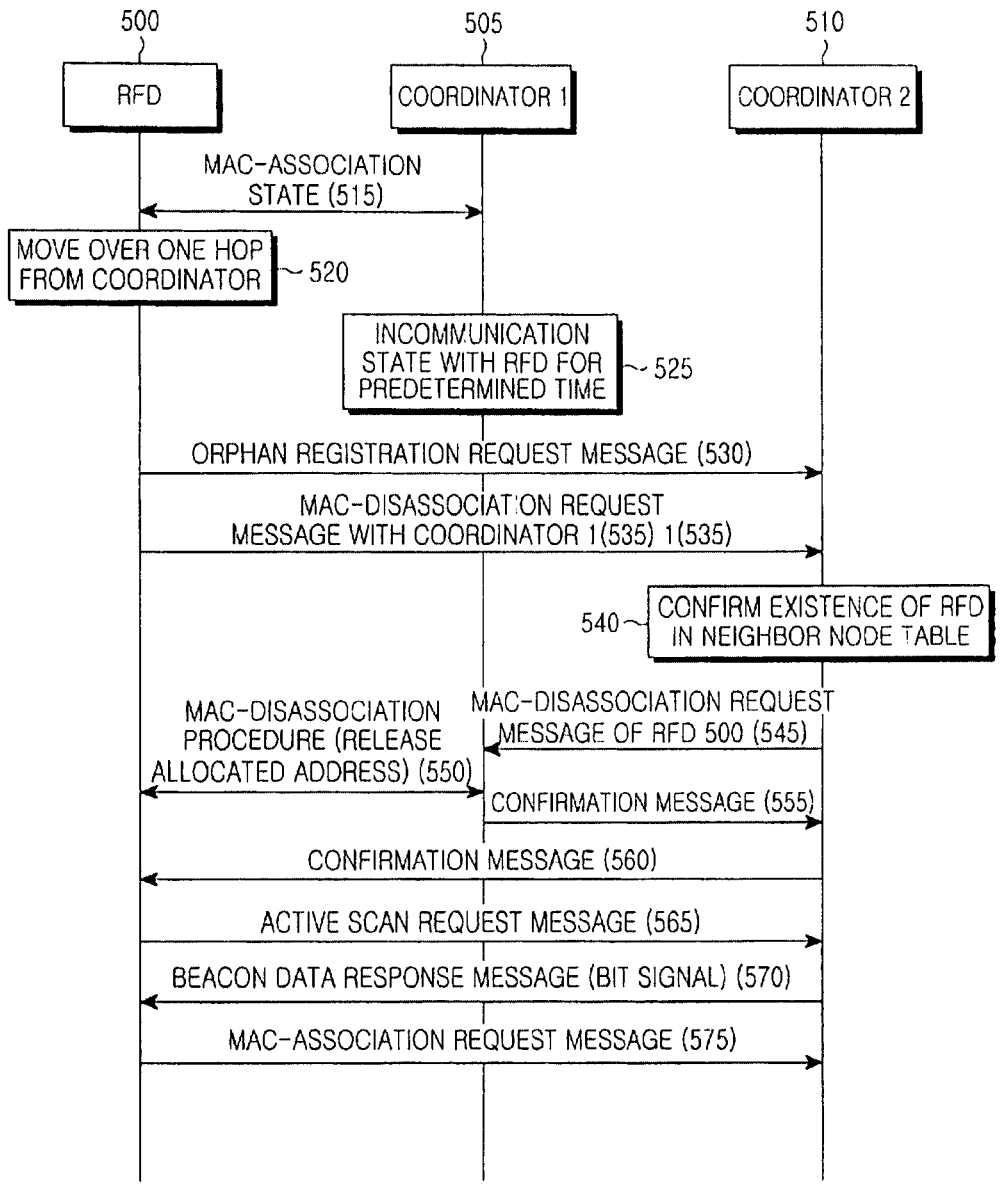
FIG. 5 is a diagram illustrating a second method of completing the MAC-disassociation procedure through neighbor nodes according to a second embodiment of the present invention.

FIG. 5 is a diagram illustrating a second method of completing the MAC-disassociation procedure through neighbor nodes according to a second embodiment of the present invention.

In a LoWPAN, an RFD 500 that is a mobile node, a coordinator 1 505 that is a parent node of the RFD 500 through performing of the MAC-association procedure with the RFD 500. and a coordinator 2 510 are provided. Here, although it is exemplified that one coordinator 2 510 corresponds to the neighbor node of the RFD 500 and the coordinator 1 505, a plurality of nodes may actually exist.

In step 515, the RFD 500 and the coordinator 1 505 maintain the MAC-association state with each other, and perform data communication with each other.

In step 520, the RFD 500 moves and leaves the one-hop range of the coordinator 1 500. Then, if the coordinator 1 505 recognizes the non-communication state with the RFD 500 for a predetermined time in step 525, the coordination 1 505 transmits an orphan registration request message of the RFD 500 to its neighbor node, i.e. the coordinator 2 510, in step 530.

At this time, the coordinator 2 510, having received the orphan registration request message, stores the RFD 500, which maps the coordinator 1 505 having requested the registration of the orphan node and time when the orphan node registration request message is received, in its neighbor node table as an orphan node.

In step 535, the RFD 500 broadcasts the MAC-disassociation message to its neighbor node, i.e. the coordinator 2 510. The coordinator 2 510, having received the MAC-disassociation message of the RFD 500, confirms whether the RFD 500 has been registered in its neighbor node table as an orphan node in step 540. If the RFD 500 has been registered as an orphan node, the coordinator 2 510 confirms the coordinator 1 505 mapping on the orphan node, and then transfers the MAC-disassociation request message of the RFD 500 to the coordinator 1 505 in place of the RFD 500 in step 545. Then, the coordinator 1 505 performs the MAC-disassociation procedure with the RFD 500 in step 550. At this time, the coordinator 1 505 releases the allocation of the address allocated to the RFD 500 during performing of the MAC-disassociation procedure, and manages the allocated address as an address that is not in use in its address pool. Then, the coordinator 1 505 transmits a confirmation message for reporting the completion of the MAC-disassociation to the coordinator 2 510 in step 555. The coordinator 2 510, having transmitted the confirmation message, transfers the confirmation message to the RFD 500 in step 560.

In step 565, the RFD 500 transmits an active scan request message to its neighbor node, i.e. the coordinator 2 510. In step 570, the coordinator 2 510, having received the active scan request message, transmits a beacon data response message, which includes a bit signal for reporting that the RFD 500 exists in its orphan node managing table and time when the orphan node was registered, being included in a payload, to the RFD 500.

In step 575, the RFD 500 transmits the MAC-association request message to the coordinator 2 510. If a plurality of coordinators 2 510 exist and the RFD 500 has received a plurality of beacon data response messages from the plurality of coordinators, the RFD 500. in the same manner as the case illustrated in FIG. 4, preferentially selects the coordinator that has transmitted the beacon data response message having the highest signal strength among the received beacon data response messages, as an object of the MAC-association request. If there is no great difference in signal strength between the received beacon data response messages, the RFD 500 selects the coordinator having the latest registration time among the coordinators having transmitted the beacon data response messages including the bit signals.

In the second embodiment of the present invention as described above, if the RFD moves out of the communication region of its parent node and the MAC-disassociation procedure is not completed, the RFD broadcasts the MAC-disassociation request to the neighbor nodes, and the neighbor nodes, having received the MAC-disassociation request, transfer the received MAC-disassociation request to the parent node in place of the RFD 500 to complete the MAC-disassociation procedure. Thereafter, the RFD preferentially selects the coordinator, which manages the RFD as its orphan node during the MAC-association setting, as a new coordinator, and thus the address resources are not wasted.

Figure 6:
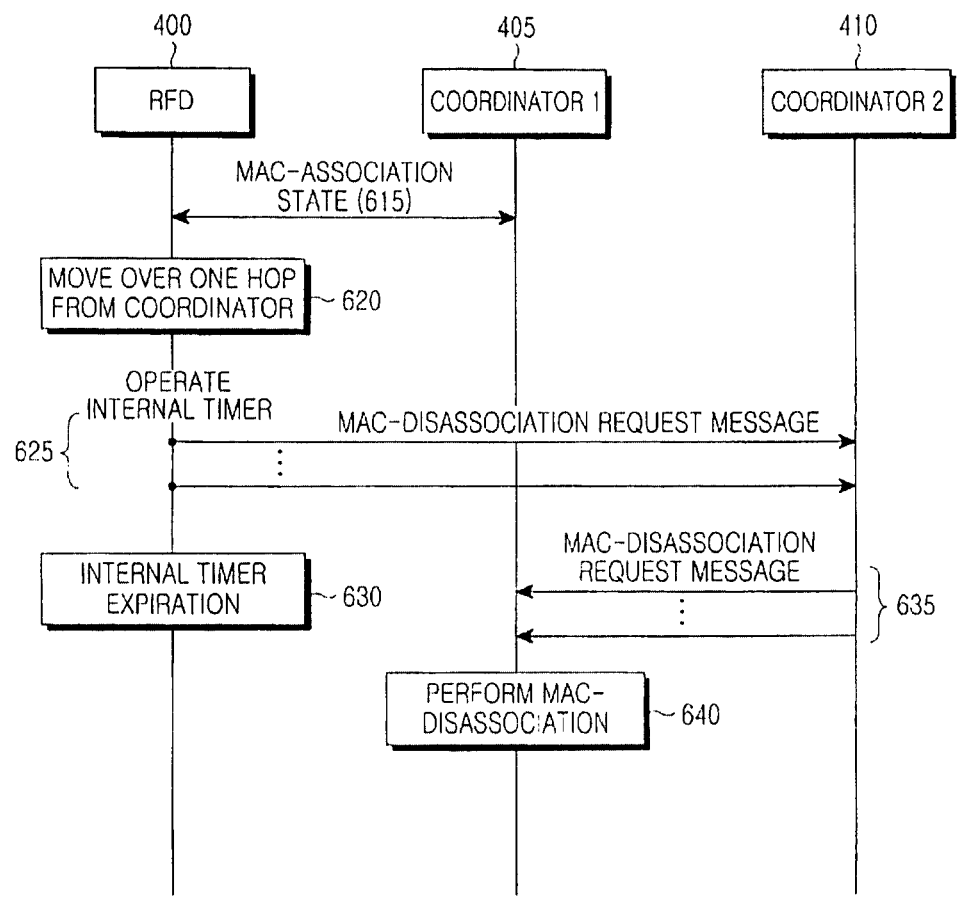
FIG. 6 is a diagram illustrating a method of completing the MAC-disassociation procedure through an RFD and a coordinator, which are in MAC-association relations with each other, according to a third embodiment of the present invention.

FIG. 6 is a diagram illustrating a method of completing the MAC-disassociation procedure through an RFD and a coordinator, which are in MAC-association relations with each other, according to a third embodiment of the present invention.

Referring to FIG. 6, an RFD 600 is in a MAC-association state with a coordinator 1 605, and transmits/receives data.

Although it is exemplified that one coordinator 2 610 corresponds to the neighbor node of the RFD 600 and the coordinator 1 605, a plurality of nodes may actually exist.

If the RFD 600 moves over one hop from the coordinator 1 and enters into a non-communication state with the coordinator 1 605 in step 620, the RFD 600 operates its internal timer, and periodically transmit a MAC-disassociation request message with the coordinator 1 605 to its neighbor node, i.e. a coordinator 2 610, in step 625. The operating time of the timer corresponds to a time for waiting for a response message to the MAC-disassociation request message from the coordinator 1 605.

Then, in step 630, if the operating time of the timer expires, regardless of whether the coordinator 1 605 has received the MAC-disassociation request message, the RFD 600 discontinues the broadcasting of the MAC-disassociation request message with the coordinator 1 605, and perform the MAC-disassociation procedure with the coordinator 1 605 for itself. In step 635, the coordinator 2 610, having received the MAC-disassociation request message, rebroadcasts the MAC-disassociation request message to its neighbor nodes. In step 640, if the coordinator 1 605 receives the MAC-disassociation request message, the coordinator 1 605 performs the MAC-disassociation procedure with the RFD 600. If the coordinator 1 605 confirms the non-communication state with the RFD 600 for a predetermined time, the coordinator 1 605 operates the internal timer. If the MAC-disassociation request message of the RFD 600 is not received from the RFD 600 or the neighbor node of the coordinator 1 605 until the operating time of the timer expires, the coordinator 1 605 performs the MAC-disassociation procedure with the RFD 600.

As described above, according to the third embodiment of the present invention, the RFD and the corresponding parent node perform the MAC-disassociation procedure, respectively, and thus the waste of the address resources can be prevented in the case where the RFD performs the MAC-association procedure with another coordinator.

While the invention has been shown and described with reference to certain exemplary embodiments thereof, it will be understood by those skilled in the art that various changes in form and detail may be made therein without departing from the spirit and scope of the invention as defined by the appended claims.

What is claimed is:

1. A method of managing an address allocated by a coordinator in a Low power Wireless Personal Area Network (LoWPAN), comprising the steps of:
    receiving a first beacon data request message from a mobile node that has entered into a communication region of the coordinator;
    measuring a first Link Quality Indication (LQI) of the first beacon data request message;
    setting the first LQI as a minimum communication threshold value with the mobile node;
    setting an alarm region, based on the first LQI, that is an LQI range for sensing whether the mobile node leaves the communication region;
    if a second beacon data request message is transmitted from the mobile node, measuring a second LQI of the second beacon data request message;
    checking whether the second LQI is included in the alarm region;
    if the second LQI is included in the alarm region, periodically transmitting a node alive check message to the mobile node; and
    releasing an address allocated to the mobile node according to an LQI corresponding to each of response messages transmitted, in response to the node alive check message, from the mobile node.

2. The method as claimed in claim 1, wherein releasing the address allocated to the mobile node comprises:
    if response messages corresponding to the node alive checking message are periodically transmitted from the mobile node, measuring the LQI corresponding to each of the response messages;
    if the LQI value corresponding to each of the response messages is below a set value for a predetermined time or are less than an LQI of the previously transmitted response messages for the predetermined time, receiving a disassociation request message from the mobile node; and
    releasing the allocation of the address allocated to the mobile node.

3. The method as claimed in claim 2, wherein the address allocated to the mobile node is one of addresses included in an address pool that is managed by a Personal Area Network (PAN) coordinator managing addresses of the LoWPAN, and the addresses included in the address pool have an address system corresponding to a hierarchical network structure of ZIGBEE.

4. The method as claimed in claim 1, wherein the alarm region is a remaining region obtained by subtracting a region that corresponds to the minimum communication threshold value from the communication region, and the communication region is set within a predetermined number of hops from the coordinator.

* * * * *